(12) United States Patent
Arai et al.

(10) Patent No.: US 8,728,432 B2
(45) Date of Patent: May 20, 2014

(54) PROCESS FOR PRODUCING DISPERSION OF SURFACE-TREATED CARBON BLACK POWDER, AND PROCESS FOR PRODUCING SURFACE-TREATED CARBON BLACK POWDER

(75) Inventors: Hironori Arai, Tokyo (JP); Masanobu Maeda, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 316 days.

(21) Appl. No.: 13/384,532

(22) PCT Filed: Jul. 9, 2010

(86) PCT No.: PCT/JP2010/061696
§ 371 (c)(1),
(2), (4) Date: Mar. 16, 2012

(87) PCT Pub. No.: WO2011/007730
PCT Pub. Date: Jan. 20, 2011

(65) Prior Publication Data
US 2012/0171104 A1  Jul. 5, 2012

(30) Foreign Application Priority Data
Jul. 17, 2009 (JP) .............................. 2009-168455

(51) Int. Cl.
*C09C 1/56* (2006.01)
(52) U.S. Cl.
USPC ..................... 423/449.2; 423/449.3; 264/105; 23/314
(58) Field of Classification Search
CPC .............. C09C 1/48; C09C 1/56; C09C 1/58; C09C 3/041; C09C 3/045
USPC ................ 264/105; 23/314; 423/449.2, 449.3
See application file for complete search history.

(56) References Cited

U.S. PATENT DOCUMENTS 4,608,244 A  8/1986 Sugihara et al.
4,888,215 A * 12/1989 Nakada et al. ................ 427/215

FOREIGN PATENT DOCUMENTS

| JP | 60-212466 A | 10/1985 |
| JP | 9-202838 A | 8/1997 |
| JP | 10-130424 A | 5/1998 |
| JP | 11-100524 A | 4/1999 |
| JP | 11-181192 A | 7/1999 |
| JP | 2000-053883 A | 2/2000 |
| JP | 2006-328137 A | 12/2006 |
| JP | 2009-210699 A | 9/2009 |

OTHER PUBLICATIONS

International Search Report of PCT/JP2010/061696, mailing date Aug. 3, 2010.

* cited by examiner

*Primary Examiner* — Stuart Hendrickson
(74) *Attorney, Agent, or Firm* — Westerman, Hattori, Daniels & Adrian, LLP

(57) ABSTRACT

A method of producing a surface-treated carbon black powder dispersion includes subjecting carbon black fine particles having a volume average particle size of 100 nm to 20 μm to wet granulation and drying by heating to obtain granulated carbon black having a hardness of 12 cN or less and a pH of less than 7, grinding the granulated carbon black to obtain a ground product having a volume average particle size of 20 nm to 20 μm, and subjecting the ground product to wet oxidization in an aqueous medium. The resulting surface-treated carbon black powder dispersion exhibits excellent print density, print quality, discharge stability, and storage stability when used as an inkjet printer aqueous black ink.

4 Claims, 2 Drawing Sheets

US 8,728,432 B2

PROCESS FOR PRODUCING DISPERSION OF SURFACE-TREATED CARBON BLACK POWDER, AND PROCESS FOR PRODUCING SURFACE-TREATED CARBON BLACK POWDER

TECHNICAL FIELD

The present invention relates to a method of producing a surface-treated carbon black powder dispersion and a method of producing a surface-treated carbon black powder. More particularly, the invention relates to a method of producing a surface-treated carbon black powder dispersion that is suitably used as an inkjet printer aqueous black ink, and a method of producing a surface-treated carbon black powder that is suitably used as an inkjet printer aqueous black ink pigment.

BACKGROUND ART

It is extremely difficult to stably disperse a carbon black powder in water at a high concentration due to hydrophobicity and low wettability with water. This is because the surface of carbon black has an extremely small amount of functional groups which have high affinity to water molecules (e.g., hydrophilic oxygen-containing functional groups such as a carboxyl group and a hydroxyl group). Various attempts have been made to improve the water-dispersibility of a carbon black powder by subjecting the carbon black powder to oxidization to produce hydrophilic functional groups on the surface of the carbon black powder.

An inkjet ink pigment has been produced by hydrophilizing the surface of a carbon black powder by various methods (for example, see Patent Document 1 (JP-A-2006-328137)).

In the method disclosed in Patent Document 1, a carbon black powder aqueous dispersion is produced by treating the surface of a carbon black powder with a chemical modifier (e.g., sodium peroxodisulfate) in an aqueous medium, neutralizing the acidic groups that are produced on the surface of the carbon black powder, and subjecting the resulting slurry to disaggregation. The method disclosed in Patent Document 1 provides a carbon black powder aqueous dispersion in which the amount of precipitates is reduced by forcibly disaggregating coarse particles (particles having a large particle size) dispersed in the solvent.

RELATED-ART DOCUMENT

Patent Document

Patent Document 1: JP-A-2006-328137

SUMMARY OF THE INVENTION

Problems to be Solved by the Invention

However, the inventors of the invention found that the precipitation properties are improved when forcibly disaggregating a carbon black powder in an aqueous medium, but the dispersed particles become small and are easily absorbed in a print medium (e.g., paper) since all of the particles (not only particles having a large particle size) dispersed in the aqueous medium are disaggregated. Therefore, when such a carbon black powder aqueous dispersion is used as an inkjet printer black ink, the blackness of the ink may decrease.

In view of the above situation, an object of the invention is to provide a method of producing a surface-treated carbon black powder dispersion that exhibits excellent print density, print quality, discharge stability, and storage stability when used as an inkjet printer aqueous black ink, and a method of producing a surface-treated carbon black powder that is suitably used as an inkjet printer aqueous black ink pigment.

Means for Solving the Problems

The inventors conducted extensive studies in order to solve the above problems, and found that the above problems can be solved by producing a surface-treated carbon black powder dispersion by subjecting carbon black fine particles having a volume average particle size of 100 nm to 20 µm to wet granulation and drying by heating to obtain granulated carbon black having a hardness of 12 cN or less and a pH of less than 7, grinding the granulated carbon black to obtain a ground product having a volume average particle size of 20 nm to 20 µm, and subjecting the ground product to wet oxidization in an aqueous medium. This finding has led to the completion of the invention.

According to the invention, there is provided (1) a method of producing a surface-treated carbon black powder dispersion, including subjecting carbon black fine particles having a volume average particle size of 100 nm to 20 µm to wet granulation and drying by heating to obtain granulated carbon black having a hardness of 12 cN or less and a pH of less than 7, grinding the granulated carbon black to obtain a ground product having a volume average particle size of 20 nm to 20 µm, and subjecting the ground product to wet oxidization in an aqueous medium, (2) the method of producing a surface-treated carbon black powder dispersion according to (1), wherein the carbon black fine particles are produced by a furnace method, (3) a method of producing a surface-treated carbon black powder dispersion, including subjecting carbon black fine particles having a volume average particle size of 100 nm to 20 µm to wet granulation and drying by heating to obtain granulated carbon black having a hardness of 12 cN or less and a pH of less than 7, grinding the granulated carbon black to obtain a ground product having a volume average particle size of 20 nm to 20 µm, subjecting the ground product to wet oxidization in an aqueous medium, and separating the wet-oxidized product, and (4) the method of producing a surface-treated carbon black powder dispersion according to (3), wherein the carbon black fine particles are produced by a furnace method.

Effects of the Invention

The invention thus produces a surface-treated carbon black powder dispersion that exhibits excellent print density, print quality, discharge stability, and storage stability when used as an inkjet printer aqueous black ink, and a surface-treated carbon black powder that is suitably used as an inkjet printer aqueous black ink pigment, by subjecting carbon black fine particles having a volume average particle size of 100 nm to 20 µm to wet granulation and drying by heating to obtain granulated carbon black having a hardness of 12 cN or less and a pH of less than 7, grinding the granulated carbon black to obtain a ground product having a volume average particle size of 20 nm to 20 µm, and subjecting the ground product to wet oxidization in an aqueous medium.

DESCRIPTION OF EXEMPLARY EMBODIMENTS

Figure 1:
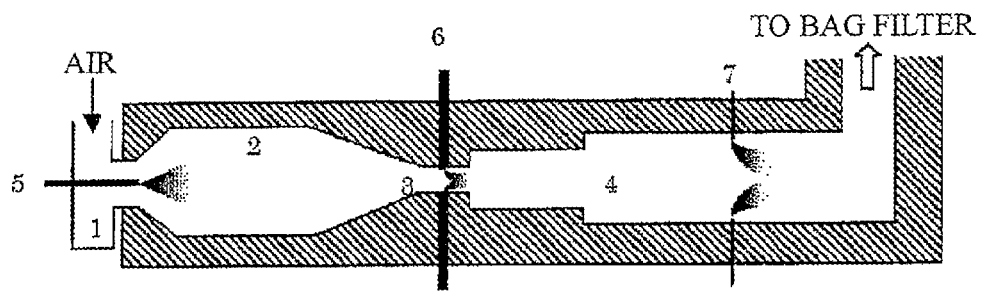
FIG. 1 is a view illustrative of a reactor for producing carbon black fine particles used in the examples of the invention.

A method of producing a surface-treated carbon black powder dispersion according to one embodiment of the invention includes subjecting carbon black fine particles having a volume average particle size of 100 nm to 20 μm to wet granulation and drying by heating to obtain granulated carbon black having a hardness of 12 cN or less and a pH of less than 7, grinding the granulated carbon black to obtain a ground product having a volume average particle size of 20 nm to 20 μm, and subjecting the ground product to wet oxidization in an aqueous medium.

In the method of producing a surface-treated carbon black powder dispersion according to one embodiment of the invention, carbon black fine particles are used as a starting material.

The carbon black fine particles have a volume average particle size of 100 nm to 20 μm, preferably 500 nm to 10 μm, and more preferably 1 to 5 μm.

If the carbon black fine particles have a volume average particle size of more than 20 μm, it may be impossible to obtain a ground product having the desired particle size by grinding (described below). Therefore, the number of coarse particles in the resulting surface-treated carbon black powder dispersion may increase. When using such a surface-treated carbon black powder dispersion as an inkjet printer pigment dispersion, the dispersion may not be appropriately discharged. If the carbon black fine particles have a volume average particle size of less than 100 nm, when using the resulting surface-treated carbon black powder dispersion as an inkjet printer pigment dispersion, the carbon black powder may have a size almost equal to that of aggregates instead of that of agglomerates that have a size suitable for a coloring material. Therefore, an ink obtained using such an inkjet printer pigment dispersion may have low print density since the ink may pass through the space between the fibers of the paper (i.e., print medium).

The volume average particle size of the carbon black fine particles herein refers to a particle size at 50% (average particle size D50) in a cumulative volume particle size distribution measured by a laser diffraction particle size analyzer.

The carbon black fine particles are not particularly limited. Examples of the carbon black fine particles include furnace black, channel black, acetylene black, thermal black, and the like. Among these, furnace black is preferable since furnace black exhibits high productivity, and the particle size can be relatively easily controlled.

Furnace black is produced by a furnace method in which liquid or gaseous hydrocarbons are incompletely combusted in hot gas. For example, furnace black may be produced by combusting a combustion gas-generating fuel with an oxygen-containing gas (e.g., air) in a furnace so that the furnace has a high-temperature combustion gas atmosphere, and introducing atomized or vaporized liquid hydrocarbons (raw material) into the furnace to partially combust, thermally decompose, or partially combust and thermally decompose the hydrocarbons.

Examples of the oxygen-containing gas include gas that contains air, oxygen, or a mixture thereof. Examples of the combustion gas-generating fuel include hydrogen, carbon monoxide, natural gas, oil gas, petroleum-derived liquid fuel such as heavy oil, and coal-derived liquid fuel such as creosote oil.

Examples of the liquid hydrocarbons (i.e., a raw material for the carbon black fine particles) include aromatic hydrocarbons such as benzene, toluene, xylene, naphthalene, and anthracene, coal-derived hydrocarbons such as creosote oil and carboxylic acid oil, petroleum-derived heavy oils such as ethylene heavy end oil and FCC oil, acetylene unsaturated hydrocarbons, ethylene hydrocarbons, and aliphatic unsaturated hydrocarbons such as pentane and hexane.

After completion of the reaction, the carbon black fine particles floating and suspended in the high-temperature combustion gas are cooled by a water spraying method or the like, and separated and collected using a cyclone, a bag filter, or the like to obtain the desired furnace black.

Furnace black having a volume average particle size of 100 nm to 20 μm may be obtained by appropriately adjusting the size of the inner space of the reactor, the reaction temperature of the liquid hydrocarbons (raw material), the raw material supply rate, and the like. For example, when using a hard furnace as the reactor, it is preferable to use a hard furnace that includes an inner space having a diameter of 0.15 to 1 m and a length of 2 to 10 m, and completely combust a fuel oil so that a high temperature area at the head of the hard furnace has a high temperature of 1400 to 1800° C. while spraying the raw material oil from a raw material oil burner so that the supply rate (linear flow rate) is as high as 100 to 900 m/s. When using a soft furnace as the reactor, it is preferable to use a soft furnace that includes an inner space having a diameter of 0.4 to 2.5 m and a length of 3 to 15 m, and heat the head of the hard furnace at 1200 to 1500° C. while spraying the raw material oil from a raw material oil burner so that the supply rate (linear flow rate) is as low as 100 m/s or less.

The method of producing a surface-treated carbon black powder dispersion according to one embodiment of the invention includes subjecting the above carbon black fine particles to wet granulation and drying by heating to produce granulated carbon black having a hardness of 12 cN or less and a pH of less than 7.

When using wet granulation, a liquid used as a granulation aid is added to the carbon black fine particles, and the mixture is kneaded with stirring and rolling.

As the liquid used as the granulation aid, an aqueous liquid or a non-aqueous liquid may be used insofar as the liquid is completely evaporated during drying by heating (described below). Among these, an aqueous liquid is preferable. As the aqueous liquid, water is preferable. If the amount of the liquid used as the granulation aid is too small, some of the carbon black fine particles may not be granulated to form a mixture of granulated carbon black and the carbon black fine particles. If the amount of the liquid used as the granulation aid is too large, the resulting product may be obtained in a gel state. Therefore, it is desirable to add an adequate amount of the liquid used as the granulation aid. Generally, it is preferable that the liquid used as the granulation aid be used in an amount of 1 to 1.5 times the mass of the carbon black fine particles.

After the addition of the liquid used as the granulation aid to the carbon black fine particles, the mixture may be kneaded manually or mechanically. The hardness of the granulated carbon black obtained by drying by heating can be controlled by adjusting the stirring force during kneading, while considering the amount of the granulation aid (liquid) that is added to the carbon black fine particles.

When using a stirrer for kneading the mixture of the carbon black fine particles and the liquid used as the granulation aid, the stirrer is preferably rotated at a rotational speed of 100 to 350 revolutions/minute (rpm), more preferably 150 to 300 rpm, and still more preferably 200 to 250 rpm. The mixture of the carbon black fine particles and the liquid used as the granulation aid is preferably kneaded for 60 to 150 seconds, more preferably 80 to 120 seconds, and still more preferably 90 to 100 seconds.

As the granulator, a granulator that includes one or more drums internally provided with special stirring pins is preferable.

It is preferable that the mixture of the carbon black fine particles and the liquid used as the granulation aid be formed into pellets or the like.

The above mixture is then preferably dried by heating using a device that can heat and dry the mixture in an oxygen-containing atmosphere. Examples of such a device include an electric heater, a rotary kiln, and the like.

It is preferable to use a device that can dry the mixture in a short time in order to increase the productivity. However, when heating the mixture at an excessively high temperature in an oxygen-containing atmosphere, the carbon black may ignite and change in properties to decrease the productivity. Therefore, it is preferable to avoid an excessively high temperature even in a local area.

Thus, it is preferable that the upper limit of the drying (heating) temperature and the drying (heating) time be appropriately selected depending on the structure of the device and the amount of the mixture to be dried. The mixture is preferably dried by heating at a temperature of about 500° C. or less, more preferably 300 to 500° C., and still more preferably 350 to 450° C. The final temperature inside the device during drying by heating is preferably 200 to 250° C. The mixture is preferably dried by heating for 60 to 180 minutes.

Examples of the drying device used for drying by heating include a rotary dryer, an air dryer, a fluidized bed dryer, a tunnel dryer, and the like. Among these, a rotary dryer is preferable.

Granulated carbon black can be obtained by drying the mixture by heating as mentioned above.

The granulated carbon black preferably has a volume average particle size of 10 to 300 μm, more preferably 50 to 250 μm, and still more preferably 100 to 220 μm.

The volume average particle size of the granulated carbon black herein refers to a particle size at 50% (average particle size D50) in a cumulative volume particle size distribution measured by a laser diffraction particle size analyzer.

In the method of producing a surface-treated carbon black powder dispersion according to one embodiment of the invention, the granulated carbon black has a hardness (IPH) of 12 cN or less, and preferably 4 to 12 cN.

If the granulated carbon black has a hardness (IPH) of 12 cN or less, it is possible to obtain a ground product having the desired particle size by grinding (described below). Therefore, the number of coarse particles in the resulting surface-treated carbon black powder dispersion decreases. When using the surface-treated carbon black powder dispersion as an inkjet printer pigment dispersion, the dispersion can be appropriately discharged.

The granulated carbon black having a hardness (IPH) of 12 cN or less may be produced by adjusting the amount of the liquid used as the granulation aid and/or the stirring force applied during kneading.

The hardness of the granulated carbon black herein refers to a value measured in accordance with "Carbon black for rubber industry—Characteristics of pelletized carbon black—Part 3: Determination of individual pellet crushing strength, method A" specified in JIS K 6219-3.

In the method of producing a surface-treated carbon black powder dispersion according to one embodiment of the invention, the granulated carbon black has a pH of less than 7, and preferably 5.5 to 6.5.

If the granulated carbon black has a pH of less than 7, it is possible to improve the wettability with an oxidizing agent and uniformly oxidize the surface of the particles during wet oxidization (described below). Therefore, when using the resulting surface-treated carbon black powder dispersion as an inkjet printer pigment dispersion, the dispersion exhibits suitable properties.

The granulated carbon black having a pH of less than 7 may be produced by drying the carbon black fine particles at a temperature of 500° C. or less in a gas atmosphere such as air, oxygen gas, or ozone gas, for example.

The pH of the granulated carbon black herein refers to a value measured in accordance with JIS K 6221.

The iodine adsorption number (IA) of the granulated carbon black is preferably 100 to 250 mg/g, more preferably 110 to 230 mg/g, and still more preferably 110 to 200 mg/g.

The specific surface area by nitrogen adsorption ($N_2SA$) of the granulated carbon black is preferably 120 to 230 $m^2/g$, more preferably 130 to 230 $m^2/g$, and still more preferably 130 to 200 $m^2/g$.

The improvement index (I.I) of the granulated carbon black is preferably 0.95 to 1.30 $m^2/mg$, and more preferably 1.1 to 1.25 $m^2/mg$.

The CTAB specific surface area of the granulated carbon black is preferably 110 to 200 $m^2/g$, and more preferably 120 to 180 $m^2/g$.

The DBP absorption of the granulated carbon black is preferably 100 to 180 $cm^3/100$ g, and more preferably 110 to 180 $cm^3/100$ g.

The 24M4-DBP absorption (24M4) of the granulated carbon black is preferably 90 to 130 $cm^3/100$ g.

The tinting strength (Tint) of the granulated carbon black is preferably 110 to 150.

The Stokes mode diameter (Dst) of the granulated carbon black is preferably 50 to 90 nm. The half width of the Stokes mode diameter (ΔDst) of the granulated carbon black is preferably 30 to 60 nm.

The iodine adsorption number, the specific surface area by nitrogen adsorption, the improvement index, the CTAB specific surface area, the DBP absorption, the 24M4-DBP absorption, the tinting strength, the Stokes mode diameter, and the half width of the Stokes mode diameter are measured by the methods as described below.

The method of producing a surface-treated carbon black powder dispersion according to one embodiment of the invention includes grinding the granulated carbon black.

It is preferable that the granulated carbon black be ground in an oxygen-containing stream. Examples of the oxygen-containing stream include an air stream and the like.

The granulated carbon black is ground so that the resulting ground product has a volume average particle size (particle size at 50% (average particle size D50) in the cumulative volume particle size distribution) of 20 nm to 20 μm, preferably 50 nm to 10 μm, and more preferably 100 nm to 5 μm.

It is preferable that the granulated carbon black is ground so that the resulting ground product has a maximum particle size (particle size at 99% (average particle size D99) in the cumulative volume particle size distribution) of 40 nm to 40 μm.

If the ground product has a volume average particle size of less than 20 nm, when using the resulting surface-treated carbon black powder dispersion as an inkjet printer pigment dispersion, the pigment (surface-treated carbon black powder) in the dispersion may have a volume average particle size of 10 nm or less. Therefore, when producing an inkjet printer ink using such an inkjet printer pigment dispersion, the ink may exhibit very low print density since the pigment may pass through the space between the fibers of the paper. If the ground product has a volume average particle size of more than 20 μm, when using the resulting surface-treated carbon black powder dispersion as an inkjet printer pigment dispersion, the pigment (surface-treated carbon black powder) in the dispersion may have a maximum particle size (particle size at 99% (average particle size D99) in the cumulative volume particle size distribution) of more than 500 nm. Therefore, when producing an inkjet printer ink using such an inkjet printer pigment dispersion, the ink may have a poor discharge capability.

In the method of producing a surface-treated carbon black powder dispersion according to one embodiment of the invention, since the granulated carbon black has a hardness of 12 cN or less, the ground product that exhibits a wide particle size distribution (i.e., the ratio (D90/D50) of the particle size at 90% (D90) in the cumulative volume particle size distribution to the volume average particle size D50 is 3 or less) can be easily produced by grinding the granulated carbon black.

The particle size of the ground product herein refers to a value measured by a laser diffraction particle size analyzer.

The grinder used for grinding the granulated carbon black is not particularly limited. Examples of the grinder include a mechanical impact grinder, a jet mill, a roller mill, and the like. Examples of the mechanical impact grinder include a grinder "Mikro ACM Pulverizer" (manufactured by Hosokawa Micron Corporation).

The volume average particle size of the ground product can be adjusted within the desired range by supplying the granulated carbon black to the grinder under the above conditions, and applying mechanical impact to the granulated carbon black.

In order to obtain a ground product having a volume average particle size of 20 nm to 20 μm using a mechanical impact grinder, the rotating body of the grinder is preferably rotated at a rotational speed of 5000 to 20,000 rpm, more preferably 7000 to 15,000 rpm, and still more preferably 9000 to 12,000 rpm.

The granulated carbon black is preferably supplied to the mechanical impact grinder at a supply rate of 5 to 20 kg/hr, more preferably 7 to 15 kg/hr, and still more preferably 8 to 13 kg/hr.

In order to obtain a ground product having a volume average particle size of 20 nm to 20 μm using a jet mill, the granulated carbon black is preferably supplied to the jet mill at a supply rate of 5 to 20 kg/hr, more preferably 7 to 15 kg/hr, and still more preferably 8 to 13 kg/hr. Gas is preferably supplied to the jet mill at a feed rate of 3 to 15 $m^3$/min, more preferably 5 to 13 $m^3$/min, and still more preferably 7 to 10 $m^3$/min. Examples of the gas that is supplied to the jet mill include air, oxygen gas, ozone gas, and the like.

The volume average particle size of the ground product can be adjusted within the desired range by supplying the gas to the jet mill under the above conditions so that the granulated carbon black collides with another granulated carbon black.

In the method of producing a surface-treated carbon black powder dispersion according to one embodiment of the invention, the ground product having the desired particle size can be obtained by granulating the carbon black fine particles, and grinding the granulated carbon black, and the pH of the ground product can be changed to a more acidic region by causing functional groups to be produced on the surface of the carbon black fine particles included in the ground product. Therefore, the efficiency of surface oxidization (described below) can be further improved.

The method of producing a surface-treated carbon black powder dispersion according to one embodiment of the invention includes subjecting the resulting ground product to wet oxidization in an aqueous medium to oxidize the surface of the ground product.

It is preferable that the surface of the ground product be oxidized by oxidizing the ground product in a solution, desalting the oxidizing agent (i.e., reduced salts of the oxidizing agent) included in the resulting slurry, and neutralizing, classifying, purifying, and then condensing the slurry.

When producing a surface-treated carbon black powder used as an inkjet pigment using the method of producing a surface-treated carbon black powder dispersion according to one embodiment of the invention, it is preferable that the ground product have a specific surface area by nitrogen adsorption ($N_2SA$) of 70 to 300 $m^2$/g, a DBP absorption of 100 to 200 $cm^3$/100 g, and an arithmetic mean particle size (dn) of agglomerates of 13 to 30 μm.

The arithmetic mean particle size (dn) of agglomerates refers to a value that is measured by dispersing the ground product in chloroform for 30 seconds using an ultrasonic washing machine at a frequency of 28 kHz, immobilizing the dispersion sample on a carbon substrate (for example, see "*Funtai Bussei Zuselsu*", edited by Research Association of Powder Technology et. al., p. 68, (c)"*Suimemnakuhou*)"), photographing the dispersion sample using an electron microscope at a direct magnification of 20,000 and a total magnification of 8000 to 100,000, measuring the diameters of 1000 carbon black particles in the photograph at random, and calculating the arithmetic mean particle size from the histogram at intervals of 3 nm.

The oxidizing agent used for oxidizing the ground product is not particularly limited. Examples of the oxidizing agent include peroxo diacids such as peroxosulfuric acid, peroxocarbonic acid, and peroxophosphoric acid, and salts thereof. Examples of the salts include salts of an alkali metal such as lithium, sodium, and potassium, ammonium salts, and the like.

As the solvent used for oxidizing the ground product, an aqueous medium is preferable. As the aqueous medium, water is preferable due to low cost and high safety. As water, purified water such as deionized water is preferable.

A surfactant may be added to the aqueous medium as necessary in order to improve the dispersibility.

As the surfactant, any of an anionic surfactant, a nonionic surfactant, and a cationic surfactant may be used.

Examples of the anionic surfactant include a fatty acid salt, an alkyl sulfate salt, an alkylaryl sulfonate, an alkyl naphthalenesulfonate, a dialkyl sulfonate, a dialkyl sulfosuccinate, an alkyl diaryl ether disulfonate, an alkyl phosphate, a polyoxyethylene alkyl ether sulfate, a polyoxyethylene alkyl aryl ether sulfate, a naphthalenesulfonic acid-formalin condensate, a polyoxyethylene alkyl phosphate salt, a glycerol borate fatty acid ester, a polyoxyethylene glycerol fatty acid ester, and the like.

Examples of the nonionic surfactant include a polyoxyethylene alkyl ether, a polyoxyethylene alkyl aryl ether, a polyoxyethylene/oxypropylene block copolymer, a sorbitan fatty acid ester, a polyoxyethylene sorbitan fatty acid ester, a glycerol fatty acid ester, a polyoxyethylene fatty acid ester, a polyoxyethylenealkylamine, a fluorine-containing nonionic surfactant, and a silicon-containing nonionic surfactant.

It is preferable that the ground product be oxidized by stirring and mixing an oxidizing agent and the aqueous medium to form an oxidizing agent solution, and stirring and mixing the oxidizing agent solution and the ground product to form a slurry. It is preferable that the oxidizing agent solution and the ground product be stirred and mixed using a stirring tank provided with a baffle, or the like.

When using purified water as the aqueous medium, the concentration of the ground product in the slurry is preferably 0.1 to 5 mass %, more preferably 0.1 to 4 mass %, and still more preferably 0.1 to 3 mass %. The concentration of the oxidizing agent in the slurry is preferably 5 to 50 mass %, more preferably 5 to 30 mass %, and still more preferably 5 to 20 mass %.

The oxidizing agent solution and the ground product are preferably stirred and mixed at a rotational speed of 200 to 500 rpm, more preferably 300 to 500 rpm, and still more preferably 400 to 500 rpm. The upper limit of the temperature during stirring and mixing is preferably 105° C., and more preferably 90° C. The lower limit of the temperature during stirring and mixing is preferably room temperature, more preferably 40° C., and still more preferably 60° C.

The oxidizing agent may be added to the ground product in a plurality of portions (e.g., 2 to 3 portions).

The oxidizing agent solution and the ground product are preferably stirred and mixed for 5 minutes to 12 hours, more preferably 1 to 12 hours, and still more preferably 3 to 12 hours.

When adding the oxidizing agent to the ground product in a plurality of portions, the total stirring time is set within the above range.

Hydrophilic acidic groups such as a carboxyl group and a hydroxyl group are thus produced on the surface of the ground product (i.e., surface treatment).

The ground product is preferably oxidized so that the surface of the ground product has a carboxyl group content of 2 to 8 mmol/m$^2$, more preferably 3 to 7 µmol/m$^2$, and still more preferably 4 to 6 µmol/m$^2$.

The carboxyl group content herein refers to a value measured by the following method. Specifically, 2 to 5 g of the oxidized ground product is added to 0.5 dm$^3$ of sodium hydrogen carbonate (concentration: 0.976 mol/dm$^3$), and the mixture is shaken for 6 hours. The reaction solution is filtered, and a hydrochloric acid aqueous solution (concentration: 0.05 mol/dm$^3$) is added to the filtrate. The carboxyl group content is quantitatively determined by neutralization titration using a sodium hydroxide aqueous solution (concentration: 0.05 mol/dm$^3$) until the pH reaches 7.0. The determined value is divided by the specific surface area by nitrogen adsorption (m$^2$/g) to obtain the carboxyl group content (µmol/m$^2$).

It is preferable to desalt the oxidizing agent (reduced salts of the oxidizing agent) in the slurry after oxidation. The oxidizing agent is preferably desalted using a membrane. Examples of the membrane used for desalting the oxidizing agent include an ultrafiltration (UF) membrane, a microfiltration (MF) membrane, a reverse osmosis (RO) membrane, an electrodialysis membrane, and the like. The UF membrane, the MF membrane, and the RO membrane are not particularly limited. As the UF membrane, a UF membrane having a molecular weight cutoff of 3000 to 300,000 is preferable. As the MF membrane, an MF membrane having a pore size of 50 nm to 1 µm is preferable.

It is preferable to repeatedly desalt the oxidizing agent using the membrane until a given electrical conductivity is reached. For example, when the carbon black solid content in the slurry is 3 mass %, it is preferable to repeatedly desalt the oxidizing agent until the electrical conductivity becomes 200 µS/cm or less.

The slurry is preferably neutralized after desalting the oxidizing agent. Examples of a neutralizer used for neutralizing the slurry include lithium hydroxide, sodium hydroxide, potassium hydroxide, rubidium hydroxide, cesium hydroxide, ammonium, quaternary ammonium hydroxide, tetramethylammonium hydroxide, tetraethylammonium hydroxide, tetrabutylammonium hydroxide, choline, acetylcholine, and the like.

It is preferable that the slurry be neutralized by dripping the neutralizer with stirring at a given temperature for a given time. The slurry may be neutralized at room temperature. However, the slurry is preferably neutralized at a temperature of room temperature to 105° C., and more preferably 95 to 105° C., so that the neutralization reaction proceeds smoothly. The slurry is preferably neutralized for 3 to 20 hours, and more preferably 2 to 5 hours. The pH of the slurry is preferably adjusted to 4.0 to 12.0 via neutralization. It is preferable to sufficiently neutralize the slurry with heating under the above conditions.

It is preferable to appropriately classify the neutralized product (slurry) to remove coarse particles so that the classified slurry has a particle size distribution that is suitable for an inkjet printer aqueous black ink. It is preferable that the neutralized product (slurry) be classified using a centrifuge.

When the slurry is neutralized with heating, a humic acid-like substance is eluted from the surface and the pore surface of the neutralized product (carbon black powder) into the slurry, and the reduced salts (oxidizing agent) that have not been desalted during desalination may be present in the slurry. Therefore, the classified slurry is preferably purified. It is preferable that the classified slurry be purified using a membrane. Examples of the membrane used for purifying the slurry include membranes similar to that used for desalination.

The resulting neutralized and purified product is appropriately filtered using a filter to remove coarse particles and foreign matter (e.g., grit), and is preferably concentrated so that a concentration suitable for an inkjet printer aqueous black ink is reached. It is preferable to concentrate the product using an ultrafiltration membrane or the like.

For example, when the concentration of the surface-treated carbon black powder in the product is 30 mass %, it is preferable to concentrate the product until the product has an electrical conductivity of less than 5 mS/cm.

A surface-treated carbon black powder dispersion can be thus obtained. The concentration of the surface-treated carbon black powder in the dispersion is preferably 30 mass % or less, and more preferably 10 to 25 mass %.

When preparing an inkjet printer aqueous black ink using the surface-treated carbon black powder dispersion obtained by the method according to one embodiment of the invention, a dispersant, a film-smoothing agent, an adhesion improver, a resin or an additive that adjusts the surface tension or adhesion to a printing material, a preservative, an antifungal agent, a viscosity controller, and the like may be appropriately added to the dispersion.

The surface-treated carbon black powder dispersion obtained by the method according to one embodiment of the invention exhibits excellent print density, print quality, discharge stability, and storage stability when used as an inkjet printer aqueous black ink.

A method of producing a surface-treated carbon black powder according to one embodiment of the invention is described below.

The method of producing a surface-treated carbon black powder according to one embodiment of the invention includes subjecting carbon black fine particles having a volume average particle size of 100 nm to 20 µm to wet granulation and drying by heating to obtain granulated carbon black having a hardness of 12 cN or less and a pH of less than 7, grinding the granulated carbon black to obtain a ground product, subjecting the ground product to wet oxidization in an aqueous medium, and separating the wet-oxidized product.

The method of producing a surface-treated carbon black powder according to one embodiment of the invention is the same as the method of producing a surface-treated carbon black powder dispersion according to one embodiment of the invention, except that a surface-treated carbon black powder is produced instead of a surface-treated carbon black powder dispersion. A surface-treated carbon black powder can be obtained by separating a wet-oxidized product by concentrating and drying the surface-treated carbon black powder dispersion obtained by the method according to one embodiment of the invention, for example. The surface-treated carbon black powder dispersion may be concentrated and dried by a known method.

A surface-treated carbon black powder obtained by the method according to one embodiment of the invention exhibits excellent print density, print quality, discharge stability, and storage stability when used as an inkjet printer ink pigment.

EXAMPLES

The invention is further described below by way of examples. Note that the invention is not limited to the following examples.

Examples 1 to 6 and Comparative Examples 1 to 9

Production of Carbon Black Fine Particles

Carbon Black Fine Particles A, B, and C (furnace carbon black) were produced using a reactor shown in FIG. 1 under different production conditions.

The reactor shown in FIG. 1 was made of a heat-resistant material. As shown in FIG. 1, air was introduced into the head of the reactor, and introduced into a combustion chamber 2 via a flow straightener 1. The combustion chamber 2 had a maximum inner diameter of 700 mm and a length of 500 mm. The inner diameter of the combustion chamber 2 was gradually reduced toward the downstream-side outlet. The minimum inner diameter of the downstream-side reduced-diameter section was 150 mm. In the combustion chamber 2, air and a fuel oil supplied through a fuel supply nozzle 5 were mixed and combusted to generate a high-temperature combustion gas, which was supplied to a narrow section 3 (inner diameter: 150 mm, length: 200 mm). The temperature at the head was 1700° C. In the narrow section 3, creosote oil (raw material) was sprayed to (mixed with) the high-temperature combustion gas through a raw material oil supply nozzle 6. The mixed gas was introduced from the narrow section 3 to a reaction section 4 provided on the downstream side of the narrow section 3 and including a small-diameter reaction chamber (inner diameter: 200 mm, length: 300 mm) and a large-diameter reaction chamber (inner diameter: 500 mm, length: 3000 mm) subsequent to the small-diameter reaction chamber, and allowed to react to produce carbon black fine particles (furnace carbon black). A cooling water nozzle 7 for terminating a reaction was provided on the downstream side of the large-diameter reaction chamber of the reaction section 4, and the carbon black fine particles were cooled to a temperature appropriate for collecting the carbon black fine particles. The cooled carbon black fine particles were separated (collected) from the gas using a bag filter or the like (not shown).

As the fuel oil, ethylene bottom oil having a specific gravity (15/4° C.) of 1.076, a viscosity at 50° C. of 55 cst, and a flash point of 85° C. was used (heated to 100° C.). As the raw material oil, creosote oil having a specific gravity (15/4° C.) of 1.132, a viscosity at 50° C. of 15.0 (cst), and a flash point of 96° C. was used (heated to 150° C.). Carbon Black Fine Particles A, B, and C were respectively produced under the conditions shown in Table 1.

The iodine adsorption number (IA), the specific surface area by nitrogen adsorption ($N_2SA$), the improvement index (I.I), the CTAB specific surface area, the DBP absorption, the 24M4-DBP absorption (24M4), the tinting strength (Tint), the pH, the Stokes mode diameter (Dst), the half width of the Stokes mode diameter ($\Delta$Dst), and the volume average particle size (D50) of Carbon Black Fine Particles A, B, and C were measured by the following methods. The results are shown in Table 1.

Iodine Adsorption Number (IA)

The iodine adsorption number was measured in accordance with "Carbon black for rubber industry—Fundamental characteristics—Part 1: Determination of iodine adsorption amount—Titration method" specified in JIS K 6217-1.

Specific Surface Area by Nitrogen Adsorption ($N_2SA$)

The specific surface area by nitrogen adsorption was measured in accordance with "Carbon black for rubber industry—Fundamental characteristics—Part 2: Determination of specific surface area—Nitrogen adsorption method, single-point method" specified in JIS K 6217-2.

Improvement Index (I.I)

The improvement index was calculated from the ratio of the specific surface area by nitrogen adsorption ($N_2SA$) to the iodine adsorption number (IA).

CTAB Specific Surface Area

The CTAB specific surface area was measured in accordance with ASTM D-3765.

DBP Absorption

The DBP absorption was measured in accordance with "Carbon black for rubber industry—Fundamental characteristics—Part 4: Determination of oil adsorption amount" specified in JIS K 6217-4.

24M4-DBP Absorption (24M4)

The 24M4-DBP absorption was measured in accordance with ASTM D-3493.

Tinting Strength (Tint)

The tinting strength was measured in accordance with ASTM D-3265.

pH

The pH was measured in accordance with "pH value—Section 1: Boiling extraction method" specified in JIS K 5101-17-1.

Stokes Mode Diameter (Dst) and Half-Width of Stokes Mode Diameter ($\Delta$Dst)

Figure 3:
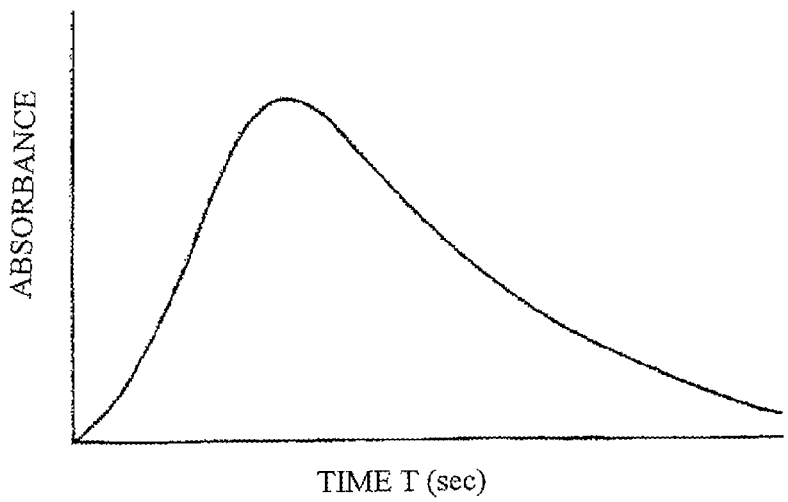
FIG. 3 is a view illustrative of a Stokes mode diameter calculation method.

The granulated carbon black was collected in accordance with JIS K 6216-1, and mixed with 20 vol % ethanol aqueous solution containing a small amount of surfactant to obtain a dispersion having a carbon black concentration of 50 mg/L. The carbon black was sufficiently dispersed using ultrasonic waves to obtain a sample. A disk centrifuge (manufactured by Joyes Lobel, UK) was set to a rotational speed of 10,000 rpm. 10 mL of a spin solution (2 mass % glycerol aqueous solution, 25° C.) was introduced into the disk centrifuge, and 1 mL of a buffer solution (20 vol % ethanol aqueous solution, 25° C.) was injected into the disk centrifuge. After the addition of 0.5 mL of the dispersion (25° C.) using a syringe, the mixture was centrifuged while operating a recorder to draw a distribution curve shown in FIG. 3 (horizontal axis: elapsed time from addition of the carbon black dispersion, vertical axis: absorbance that changed due to precipitation of the carbon black).

The time T was read from the distribution curve, and substituted in the following Expression 1 to calculate the Stokes equivalent diameter in accordance with the method of JIS K 6217-6.

$$Dst \text{ (nm)} = \sqrt{\frac{1.0498 \times 10^6 \cdot \eta}{N^2(\rho_{CB} - \rho_1)} \log \frac{r_2}{r_1}} \times \sqrt{\frac{1}{T}} \times 10^6$$

where, η is the viscosity (0.935 cp) of the spin solution, N is the disk rotational speed (10,000 rpm), $r_1$ is the radius (4.56 cm) at the carbon black dispersion injection point, $r_2$ is the radius (4.82 cm) up to the absorbance measurement point, $\rho_{CB}$ is the carbon black concentration (g/cm³), and $\rho_1$ is the concentration (1.00178 g/cm³) of the spin solution.

Figure 4:
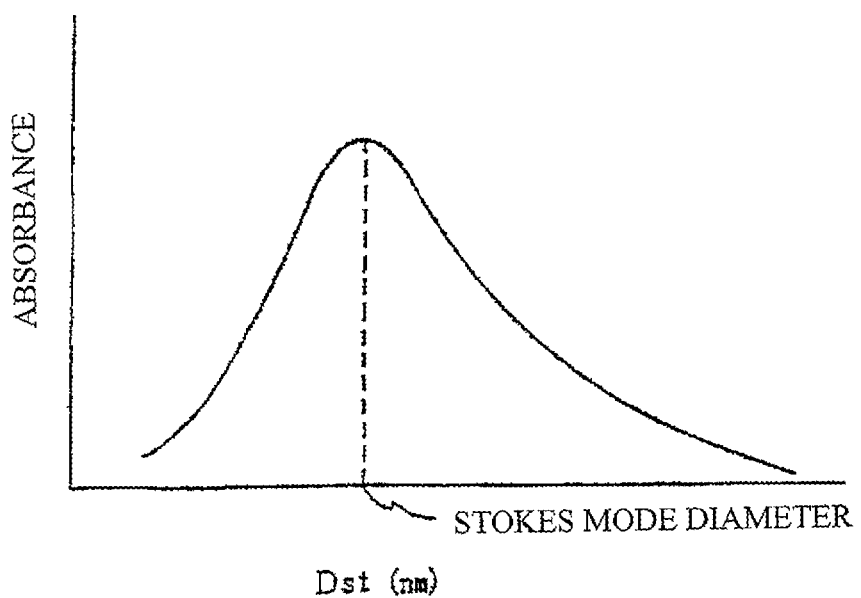
FIG. 4 is a view illustrative of a Stokes mode diameter calculation method.

The greatest-frequency Stokes equivalent diameter in the distribution curve (FIG. 4) showing the relationship between the Stokes equivalent diameter and the absorbance was determined to be the Stokes mode diameter (nm), and the difference (half width) between two Stokes equivalent diameters having a frequency of 50% of the greatest frequency was determined to be the half width of the Stokes mode diameter (ΔDst (nm)).

Volume Average Particle Size (D50)

The volume average particle size (particle size (μm) at 50% in the cumulative volume particle size distribution (D50)) was measured using a laser diffraction particle size analyzer ("SALD-2100" manufactured by Shimadzu Corporation).

produce granulated carbon black. The combustion gas temperature was controlled to be 500° C. The final drying temperature was controlled to be 230° C. The pellets were dried by heating for 60 minutes.

Figure 2:
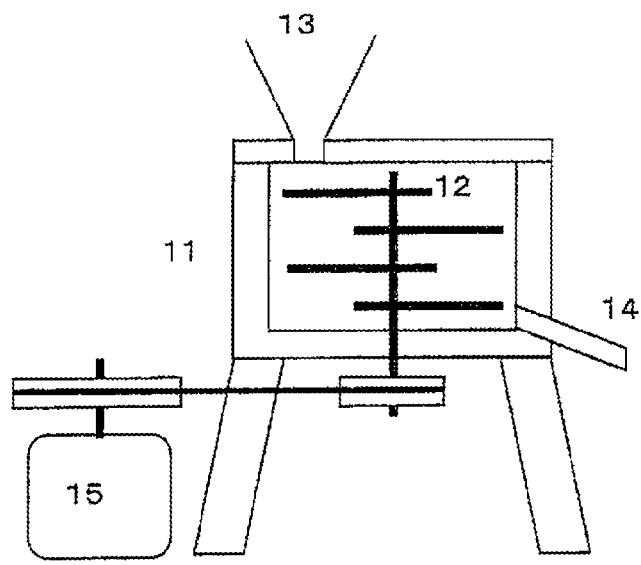
FIG. 2 is a view illustrative of a granulator used in the examples of the invention.

Granulated Carbon Black A-1 was produced using Carbon Black Fine Particles A, Granulated Carbon Black B-1 was produced using Carbon Black Fine Particles B, and Granulated Carbon Black C-1 was produced using Carbon Black Fine Particles C, by utilizing the granulator shown in FIG. 2 under the conditions shown in Table 2.

Separately, Comparative Granulated Carbon Black A-2 was produced using Carbon Black Fine Particles A, Comparative Granulated Carbon Black B-2 was produced using Carbon Black Fine Particles B, and Comparative Granulated Carbon Black C-2 was produced using Carbon Black Fine Particles C, by utilizing the granulator shown in FIG. 2 under the conditions shown in Table 2.

The iodine adsorption amount (IA), the specific surface area by nitrogen adsorption ($N_2SA$), the improvement index (I.I), the CTAB specific surface area, the DBP absorption, the 24M4-DBP absorption (24M4), the tinting strength (Tint), the pH, the Stokes mode diameter (Dst), the half width of the Stokes mode diameter (ΔDst), and the volume average particle size (D50) of Granulated Carbon Black A-1, Granulated

TABLE 1

|  |  | Carbon Black Fine Particles A | Carbon Black Fine Particles B | Carbon Black Fine Particles C |
|---|---|---|---|---|
| Production conditions | Total amount of air supplied (amount of air for atomizing oil + amount of combustion air) (Nm³/h) | 5400 | 5300 | 5600 |
|  | Amount of air for atomizing oil (Nm³/h) | 200 | 200 | 200 |
|  | Combustion oil supply rate (kg/h) | 305 | 300 | 250 |
|  | Raw material oil supply rate (kg/h) | 1300 | 1400 | 800 |
| Properties | Iodine adsorption number (IA) (mg/g) | 144 | 144 | 115 |
|  | Specific surface area by nitrogen adsorption ($N_2SA$) (m²/g) | 169 | 143 | 132 |
|  | Improvement index (I.I)(m²/mg) | 1.173 | 0.993 | 1.148 |
|  | CTAB specific surface area (m²/g) | 159 | 135 | 124 |
|  | DBP absorption (cm³/100 g) | 125 | 122 | 171 |
|  | 24M4-DBP absorption (cm³/100 g) | 95 | 94 | 127 |
|  | Tinting strength (Tint) | 142 | 135 | 116 |
|  | pH | 7.5 | 7.5 | 7.4 |
|  | Dst (nm) | 53 | 59 | 85 |
|  | ΔDst (nm) | 36 | 40 | 59 |
|  | Volume average particle size (D50) (μm) | 4.5 | 5.1 | 4.8 |

Production of Granulated Carbon Black

Granulated carbon black was produced using Carbon Black Fine Particles A, B, and C by utilizing a granulator shown in FIG. 2.

Specifically, the carbon black fine particles were introduced into a kneading vessel 11 via an inlet 13, and an adequate amount of water was introduced into the kneading vessel 11. Kneading rods 12 were rotated using a motor 15 to obtain pellets, which were discharged via an outlet 14. The pellets were dried in air using a rotary kiln (inner diameter: 1 m, length: 2 m) that was heated by combusting propane gas to Carbon Black B-1, Granulated Carbon Black C-1, Comparative Granulated Carbon Black A-2, Comparative Granulated Carbon Black B-2, and Comparative Granulated Carbon Black C-2 were measured in the same manner as described above.

The hardness (IPH) of Carbon Black Fine Particles A, B, and C was measured in accordance with "Carbon black for rubber industry—Characteristics of pelletized carbon black—Part 3: Determination of individual pellet crushing strength, method A" specified in JIS K 6219-3.

The results are shown in Table 2.

TABLE 2

|  |  | Granulated Carbon Black A-1 | Granulated Carbon Black B-1 | Granulated Carbon Black C-1 | Comparative Granulated Carbon Black A-2 | Comparative Granulated Carbon Black B-2 | Comparative Granulated Carbon Black C-2 |
|---|---|---|---|---|---|---|---|
| Granulation conditions | Amount of carbon black fine particles (kg) | 1.0 | 1.0 | 1.0 | 1.0 | 1.0 | 1.0 |
|  | Amount of water (L) | 1.2 | 1.3 | 1.5 | 1.15 | 1.3 | 1.4 |
|  | Rotational speed (rpm) | 250 | 250 | 250 | 400 | 400 | 400 |
|  | Kneading time (second) | 90 | 90 | 90 | 90 | 90 | 90 |

TABLE 2-continued

|  |  | Granulated Carbon Black A-1 | Granulated Carbon Black B-1 | Granulated Carbon Black C-1 | Comparative Granulated Carbon Black A-2 | Comparative Granulated Carbon Black B-2 | Comparative Granulated Carbon Black C-2 |
|---|---|---|---|---|---|---|---|
| Properties | Iodine adsorption number (IA) (mg/g) | 145 | 145 | 115 | 145 | 145 | 115 |
|  | Specific surface area by nitrogen adsorption ($N_2SA$) ($m^2/g$) | 169 | 143 | 132 | 169 | 143 | 132 |
|  | Improvement index (I.I) ($m^2/mg$) | 1.166 | 0.986 | 1.148 | 1.166 | 0.986 | 1.148 |
|  | CTAB specific surface area ($m^2/g$) | 159 | 135 | 124 | 159 | 135 | 124 |
|  | DBP absorption ($cm^3/100\,g$) | 108 | 116 | 162 | 108 | 116 | 162 |
|  | 24M4-DBP absorption ($cm^3/100\,g$) | 95 | 94 | 127 | 95 | 94 | 127 |
|  | Tinting strength (Tint) | 142 | 135 | 116 | 142 | 135 | 116 |
|  | pH | 5.5 | 5.7 | 6.1 | 5.2 | 5.1 | 5.8 |
|  | Dst (nm) | 53 | 59 | 85 | 53 | 59 | 85 |
|  | ΔDst (nm) | 36 | 40 | 59 | 36 | 40 | 59 |
|  | Hardness (IPH) (cN) | 9 | 7 | 10 | 18 | 16 | 14 |
|  | Volume average particle size (D50) (μm) | 150 | 220 | 180 | 320 | 420 | 410 |

Granulated Carbon Black A-1, Granulated Carbon Black B-1, and Granulated Carbon Black C-1 were respectively ground using a mechanical impact grinder ("Mikro ACM Pulverizer ACM-2EC" manufactured by Hosokawa Micron Corporation) at a supply rate of 10 kg/hr and a grinder rotational speed of 9000 rpm to obtain ground products of Examples 1 to 3.

Granulated Carbon Black A-1, Granulated Carbon Black B-1, and Granulated Carbon Black C-1 were respectively supplied to a jet mill ("STJ-400" manufactured by Seishin Enterprise Co., Ltd.) at a supply rate of 10 kg/h while supplying air, oxygen gas, or ozone gas to the jet mill at a feed rate of 8.8 $m^3$/min so that collision occurred between each granulated carbon black to obtain ground products of Examples 4 to 6.

The volume average particle size D50 (particle size (μm) at 50% in the cumulative volume particle size distribution) and the maximum particle size D99 (particle size (μm) at 99% in the cumulative volume particle size distribution) of the ground products were measured using a laser diffraction particle size analyzer ("SALD-2100" manufactured by Shimadzu Corporation). The results are shown in Table 3.

Granulated Carbon Black A-2, Granulated Carbon Black B-2, and Granulated Carbon Black C-2 were respectively ground using a mechanical impact grinder ("Mikro ACM Pulverizer ACM-2EC" manufactured by Hosokawa Micron Corporation) under the same conditions as those used for producing the ground products of Examples 1 to 3 to obtain ground products of Comparative Examples 1 to 3. Carbon Black Fine Particles A, B, and C were respectively ground using a jet mill ("STJ-400" manufactured by Seishin Enterprise Co., Ltd.) under the same conditions as those used for producing the ground products of Examples 4 to 6 to obtain ground products of Comparative Examples 4 to 6.

The volume average particle size D50 (particle size (μm) at 50% in the cumulative volume particle size distribution) and the maximum particle size D99 (particle size (μm) at 99% in the cumulative volume particle size distribution) of the ground products were measured using a laser diffraction particle size analyzer ("SALD-2100" manufactured by Shimadzu Corporation). The results are shown in Table 4.

In Comparative Examples 7 to 9, Carbon Black Fine Particles A, B, and C were respectively used without grinding. The volume average particle size D50 and the maximum particle size D99 of Carbon Black Fine Particles A, B, and C are also shown in Table 4.

TABLE 3

|  | Example 1 | Example 2 | Example 3 | Example 4 | Example 5 | Example 6 |
|---|---|---|---|---|---|---|
|  | Grinding target | | | | | |
|  | Granulated Carbon Black A-1 | Granulated Carbon Black B-1 | Granulated Carbon Black C-1 | Granulated Carbon Black A-1 | Granulated Carbon Black B-1 | Granulated Carbon Black C-1 |
| Grinder | Mechanical impact grinder | | | Jet mill | | |
| D50 (μm) | 3.3 | 4.7 | 4.2 | 0.37 | 0.52 | 0.48 |
| D99 (μm) | 15 | 17 | 16 | 0.51 | 0.71 | 0.62 |

TABLE 4

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
|  |  |  |  | Grinding target |  |  |  |  |  |
|  | Comparative Granulated Carbon Black A-2 | Comparative Granulated Carbon Black B-2 | Comparative Granulated Carbon Black C-2 | Carbon Black Fine Particles A | Carbon Black Fine Particles B | Carbon Black Fine Particles C | Carbon Black Fine Particles A | Carbon Black Fine Particles B | Carbon Black Fine Particles C |
| Grinder | Mechanical impact grinder | | | Jet mill | | | No grinding | | |
| D50 (μm) | 25 | 30 | 35 | 0.032 | 0.054 | 0.038 | 4.5 | 5.1 | 4.8 |
| D99 (μm) | 65 | 75 | 74 | 0.058 | 0.079 | 0.067 | 17 | 18 | 15 |

Wet Oxidization

Each ground product having the properties shown in Table 3 was subjected to wet oxidization by the following method to obtain surface-treated carbon black powder dispersions of Examples 1 to 6.

As the oxidizing agent, sodium peroxodisulfate ($Na_2S_2O_8$) was used, The amount of sodium peroxodisulfate necessary for oxidizing 100 g of the ground product was calculated by the following formula 1 so that 0.20 mmol/m² of sodium peroxodisulfate reacted per unit surface area (m²) of the ground product. Sodium peroxodisulfate was weighed in the amount calculated by the formula 1, and dissolved in purified water to obtain 3 dm³ of a sodium peroxodisulfate aqueous solution. The sodium peroxodisulfate aqueous solution was mixed with 100 g of the ground product, and the ground product was oxidized at a reaction temperature of 60° C. and a stirring speed of 8.33 s⁻¹ for 10 hours.

Necessary amount of sodium peroxodisulfate=(number of moles (mmol/m²) of sodium peroxodisulfate required per unit surface area of ground product)×(specific surface area (m²/g) of ground product)×(equivalent (238.1 g/mol) of sodium peroxodisulfate)   (1)

Note that the specific surface area by nitrogen adsorption ($N_2SA$) of the granulated carbon black shown in Table 2 was used as the specific surface area of the ground product.

The reaction solution was then desalted by circulating the reaction solution through an ultrafiltration membrane having a molecular weight cutoff of 50,000 ("AHP-1010" manufactured by Asahi Kasei Corporation) until the solid content was 3 mass % and the electrical conductivity was 0.2 mS/cm.

The resulting solution was neutralized with a sodium hydroxide aqueous solution so that the pH was 9.0. The neutralized carbon black dispersion was again put in the stirring tank, and thermally neutralized at a reaction temperature of 100° C. and a stirring speed of 6.67 s⁻¹ for 3 hours in order to immobilize the base. The resulting slurry having a solid content of 3 mass % was classified using a continuous centrifuge with a continuous rotor at a rotational speed of 117 s⁻¹ and a water flow rate of 500 mL/min.

Unnecessary salts and humates were removed from the slurry by purifying the slurry using an ultrafiltration membrane having a molecular weight cutoff of 50,000 until the electrical conductivity was reduced to 0.18 mS/cm or less. The slurry was then concentrated to a concentration of 20 to 23 mass % using an ultrafiltration membrane having a molecular weight cutoff of 50,000, and filtered using a filter having a pore size of 0.5 μm to obtain a surface-treated carbon black powder aqueous dispersion.

The samples having the properties shown in Table 4 were subjected to the above treatment so as to produce surface-treated carbon black powder dispersions of Comparative Examples 1 to 9. In Comparative Examples 1 to 3, a surface-treated carbon black powder dispersion could not be obtained since the ultrafiltration membrane clogged during desalination after wet oxidation.

The solid content, the initial viscosity, the particle size, the pH, the electrical conductivity, and the filterability of the resulting surface-treated carbon black powder dispersion were evaluated by the following methods. The evaluation results for the surface-treated carbon black powder dispersions of Examples 1 to 6 are shown in Table 5, and the evaluation results for the surface-treated carbon black powder dispersions of Comparative Examples 4 to 9 are shown in Table 6.

Solid Content

The solid content was measured using an analyzer "MB-30C" (manufactured by MOISTURE BALANCE).

Initial Viscosity

The surface-treated carbon black powder dispersion placed in an airtight container was kept in a heat-retention device at 70° C. for 1 week, and the viscosity was measured as the initial viscosity. The viscosity was measured using an E-type viscometer ("Viscometer TV-30" manufactured by Toki Sangyo Co., Ltd.).

Particle Size

The particle size (D50 and D99) of the surface-treated carbon black powder included in the surface-treated carbon black powder dispersion and the surface-treated carbon black powder dispersion subjected to the above initial viscosity measurement was measured.

The particle size was measured using a heterodyne laser Doppler particle size analyzer ("UPA model 9340" manufactured by Microtrac Inc.). When particles in Brownian motion in a suspension are irradiated with a laser beam, the frequency of scattered light is modulated due to the Doppler effect. The heterodyne laser Doppler method determines the magnitude of the Brownian motion (i.e., particle size) from the degree of frequency modulation.

pH

The pH of the surface-treated carbon black powder dispersion was measured using a pH meter ("HM-30V" manufactured by To a Electronics Ltd.).

Electric Conductivity

The electrical conductivity of the surface-treated carbon black powder dispersion was measured using an electrical conductivity meter ("CM-30G" manufactured by Toa Electronics Ltd.).

Filterability 100 g of the surface-treated carbon black powder dispersion was subjected to a filtration test using a filter having a diameter of 47 mm and a pore size of 5 μm under a reduced pressure of 40 cmHg, and the ratio of the amount of the sample filtered to the amount of the sample supplied was calculated.

TABLE 5

|  | Example 1 | Example 2 | Example 3 | Example 4 | Example 5 | Example 6 |
|---|---|---|---|---|---|---|
| Grinding target | Granulated Carbon Black A-1 | Granulated Carbon Black B-1 | Granulated Carbon Black C-1 | Granulated Carbon Black A-1 | Granulated Carbon Black B-1 | Granulated Carbon Black C-1 |
| Grinder | Mechanical impact grinder | | | Jet mill | | |
| Solid content (mass %) | 19.60 | 19.54 | 19.52 | 20.10 | 19.89 | 19.87 |
| Initial viscosity (cP) | 6.57 | 6.00 | 10.00 | 7.54 | 7.12 | 12.40 |
| D50 (nm) | 114 | 133 | 177 | 105 | 124 | 164 |
| D99 (nm) | 270 | 320 | 458 | 255 | 312 | 427 |
| pH | 6.21 | 6.00 | 7.00 | 6.31 | 6.12 | 6.89 |
| Electrical conductivity (mS/cm) | 1.160 | 1.110 | 1.123 | 1.220 | 1.125 | 1.214 |
| Filterability (%) | 100 | 100 | 100 | 100 | 100 | 100 |

TABLE 6

|  | Comparative Example 4 | Comparative Example 5 | Comparative Example 6 | Comparative Example 7 | Comparative Example 8 | Comparative Example 9 |
|---|---|---|---|---|---|---|
| Grinding target | Carbon Black Fine Particles A | Carbon Black Fine Particles B | Carbon Black Fine Particles C | Carbon Black Fine Particles A | Carbon Black Fine Particles B | Carbon Black Fine Particles C |
| Grinder | | Jet mill | | | No grinding | |
| Solid content (mass %) | 19.79 | 19.99 | 19.75 | 19.75 | 19.87 | 19.74 |
| Initial viscosity (cP) | 9.15 | 10.23 | 24.23 | 8.79 | 9.54 | 21.25 |
| D50 (nm) | 89 | 108 | 148 | 130 | 156 | 205 |
| D99 (nm) | 214 | 289 | 387 | 350 | 460 | 520 |
| pH | 6.78 | 6.89 | 6.54 | 6.34 | 6.12 | 6.22 |
| Electrical conductivity (mS/cm) | 1.358 | 1.412 | 1.745 | 1.17 | 1.15 | 1.04 |
| Filterability (%) | 100 | 100 | 100 | 70 | 50 | 30 |

Evaluation of Ink Composition Produced Using Surface-Treated Carbon Black Powder Dispersion Production of Ink Composition Ink compositions for an inkjet printer α and ink compositions for an inkjet printer β were produced using the surface-treated carbon black powder dispersions of Examples 1 to 6 and Comparative Examples 4 to 9 (see Table 7).

The ink composition for the inkjet printer α was filtered under reduced pressure using a filter having a pore size of 5 μm to remove coarse particles, and the ink composition for the inkjet printer β was filtered under reduced pressure using a filter having a pore size of 0.8 μm to remove coarse particles. A printing test was performed using the resulting ink.

The filter clogged when filtering the ink composition for the inkjet printer β produced using the surface-treated carbon black powder dispersion of Comparative Example 9 under reduced pressure (i.e., an ink could not be obtained).

TABLE 7

| Ink composition for inkjet printer α | |
|---|---|
| Carbon black | 6 |
| Glycerol | 14 |
| Diethylene glycol monobutyl ether | 5 |
| Acetylene glycol | 1 |

TABLE 7-continued

| Benzotriazole | 0.02 |
|---|---|
| Proxel XL-2 | 0.03 |
| Triethanolamine | 0.8 |
| Purified water | 73.15 |
| Total | 100 |

| Ink composition for inkjet printer β | |
|---|---|
| Carbon black | 5 |
| 2-Pyrrolidone | 9 |
| 1.5-Pentanediol | 2 |
| Ethoxylated glycerol | 5 |
| KOH (pH: 8.5) | X* |
| Purified water | 79.0-X* |
| Total | 100 |

(mass %)
*X refers to the amount necessary for adjusting the pH of the ink composition to 8.5.

Evaluation of Ink Composition

The ink composition was evaluated by the following tests. The results are shown in Tables 8 to 11.

Printing Test

The print density of the ink composition was measured using Xerox 4024 paper, Xerox 4200 paper, Xerox P paper, high-quality standard paper a, and high-quality paper b as printing paper. The print density was measured using a spectrodensitometer "X-Rite 504". The printing test was performed in a "fast" printing mode and an "enhanced" printing mode when using the Xerox 4024 paper. The printing test was performed in a "fast" printing mode when using the other types of paper.

Storage Stability Test

The initial viscosity of the ink composition, and the viscosity of the ink composition that had been stored in a heat-retention device at 70° C. for 4 weeks, were measured. The viscosity was measured using an E-type viscometer ("Viscometer TV-30" manufactured by Toki Sangyo Co., Ltd.).

The particle size (D50 and D99) of the surface-treated carbon black particles in the ink composition, and the particle size (D50 and D99) of the surface-treated carbon black particles in the ink composition that had been stored in a heat-retention device at 70° C. for 4 weeks, were measured. The particle size was measured using a heterodyne laser Doppler particle size analyzer ("UPA model 9340" manufactured by Microtrac Inc.).

Long-Term Reliability Test

The ink composition was subjected to a long-term reliability test using a reliability tester (manufactured by MICROJET Corporation). A case where there was no difference between the print quality after 50,000 sheets of paper were printed and the initial print quality was evaluated as "Acceptable".

TABLE 8

Ink composition for inkjet printer α

| Surface-treated carbon black powder dispersion | | Example 1 | Example 2 | Example 3 | Example 4 | Example 5 | Example 6 |
|---|---|---|---|---|---|---|---|
| Print density | XEROX 4024 (fast) | 1.05 | 1.11 | 1.20 | 1.04 | 1.09 | 1.18 |
| | XEROX 4024 (enhanced) | 1.35 | 1.40 | 1.54 | 1.33 | 1.39 | 1.51 |
| | XEROX 4200 (enhanced) | 1.40 | 1.50 | 1.58 | 1.38 | 1.48 | 1.55 |
| | XEROX P (enhanced) | 1.30 | 1.42 | 1.50 | 1.27 | 1.40 | 1.48 |
| | High-quality standard paper a (enhanced) | 1.40 | 1.52 | 1.61 | 1.39 | 1.49 | 1.58 |
| Storage stability | Initial viscosity (cP) | 2.54 | 2.61 | 2.76 | 2.64 | 2.64 | 2.69 |
| | Initial D50 (nm) | 113 | 130 | 170 | 103 | 118 | 149 |
| | Initial D99 (nm) | 268 | 297 | 440 | 249 | 308 | 418 |
| | Viscosity after storage at 70° C. for 4 weeks (cP) | 2.42 | 2.58 | 2.64 | 2.55 | 2.58 | 2.57 |
| | D50 after storage at 70° C. for 4 weeks (nm) | 110 | 127 | 168 | 101 | 112 | 144 |
| | D99 after storage at 70° C. for 4 weeks (nm) | 257 | 288 | 435 | 237 | 301 | 409 |
| | Long-term reliability test (print quality) | Acceptable | Acceptable | Acceptable | Acceptable | Acceptable | Acceptable |

TABLE 9

Ink composition for inkjet printer β

| Surface-treated carbon black powder dispersion | | Example 1 | Example 2 | Example 3 | Example 4 | Example 5 | Example 6 |
|---|---|---|---|---|---|---|---|
| Print density | XEROX 4024 (fast) | 1.47 | 1.57 | 1.62 | 1.46 | 1.57 | 1.60 |
| | XEROX 4024 (enhanced) | 1.50 | 1.60 | 1.65 | 1.49 | 1.58 | 1.62 |
| | XEROX 4200 (enhanced) | 1.47 | 1.59 | 1.64 | 1.48 | 1.58 | 1.63 |
| | XEROX P (enhanced) | 1.49 | 1.62 | 1.66 | 1.48 | 1.60 | 1.64 |
| | High-quality paper b (enhanced) | 1.49 | 1.62 | 1.65 | 1.48 | 1.61 | 1.65 |
| Storage stability | Initial viscosity (cP) | 2.21 | 2.49 | 2.64 | 2.31 | 2.51 | 2.61 |
| | Initial D50 (nm) | 111 | 128 | 164 | 104 | 114 | 157 |
| | Initial D99 (nm) | 265 | 289 | 439 | 259 | 275 | 422 |
| | Viscosity after storage at 70° C. for 4 weeks (cP) | 2.14 | 2.37 | 2.59 | 2.29 | 2.44 | 2.54 |
| | D50 after storage at 70° C. for 4 weeks (nm) | 109 | 124 | 159 | 101 | 107 | 149 |
| | D99 after storage at 70° C. for 4 weeks (nm) | 259 | 278 | 428 | 248 | 267 | 411 |
| | Long-term reliability test (print quality) | Acceptable | Acceptable | Acceptable | Acceptable | Acceptable | Acceptable |

TABLE 10

Ink composition for inkjet printer α

| Surface-treated carbon black powder dispersion | | Comparative Example 4 | Comparative Example 5 | Comparative Example 6 | Comparative Example 7 | Comparative Example 8 | Comparative Example 9 |
|---|---|---|---|---|---|---|---|
| Print density | XEROX 4024 (last) | 0.87 | 0.98 | 1.25 | 1.15 | 1.22 | 1.30 |
| | XEROX 4024 (enhanced) | 1.12 | 1.12 | 1.45 | 1.46 | 1.52 | 1.60 |
| | XEROX 4200 (enhanced) | 1.25 | 1.24 | 1.50 | 1.48 | 1.62 | 1.65 |
| | XEROX P (enhanced) | 1.18 | 1.15 | 1.55 | 1.44 | 1.51 | 1.62 |
| | High-quality standard paper a (enhanced) | 1.21 | 1.18 | 1.58 | 1.50 | 1.64 | 1.71 |

TABLE 10-continued

Ink composition for inkjet printer α

| Surface-treated carbon black powder dispersion | | Comparative Example 4 | Comparative Example 5 | Comparative Example 6 | Comparative Example 7 | Comparative Example 8 | Comparative Example 9 |
|---|---|---|---|---|---|---|---|
| Storage stability | Initial viscosity (cP) | 3.61 | 3.67 | 4.25 | 3.58 | 3.78 | 4.57 |
| | Initial D50 (nm) | 87 | 105 | 141 | 128 | 147 | 197 |
| | Initial D99 (nm) | 208 | 278 | 378 | 345 | 458 | 514 |
| | Viscosity after storage at 70° C. for 4 weeks (cP) | 3.58 | 3.64 | 4.19 | 3.47 | 3.74 | 4.54 |
| | D50 after storage at 70° C. for 4 weeks (nm) | 84 | 98 | 138 | 124 | 138 | 184 |
| | D99 after storage at 70° C. for 4 weeks (nm) | 204 | 265 | 364 | 337 | 449 | 503 |
| Long-term reliability test (print quality) | | Acceptable | Acceptable | Acceptable | Significantly deteriorated | Could be printed on only up to 30,000 sheets of paper | Could be printed on only up to 20,000 sheets of paper |

TABLE 11

Ink composition for inkjet printer β

| Surface-treated carbon black powder dispersion | | Comparative Example 4 | Comparative Example 5 | Comparative Example 6 | Comparative Example 7 | Comparative Example 8 |
|---|---|---|---|---|---|---|
| Print density | XEROX 4024 (fast) | 1.28 | 1.34 | 1.37 | 1.51 | 1.59 |
| | XEROX 4024 (enhanced) | 1.32 | 1.38 | 1.41 | 1.53 | 1.61 |
| | XEROX 4200 (enhanced) | 1.30 | 1.37 | 1.42 | 1.50 | 1.61 |
| | XEROX P (enhanced) | 1.32 | 1.39 | 1.42 | 1.51 | 1.64 |
| | High-quality paper b (enhanced) | 1.33 | 1.38 | 1.41 | 1.51 | 1.64 |
| Storage stability | Initial viscosity (cP) | 3.44 | 3.54 | 4.12 | 3.42 | 3.61 |
| | Initial D50 (nm) | 85 | 101 | 139 | 124 | 139 |
| | Initial D99 (nm) | 204 | 274 | 369 | 337 | 447 |
| | Viscosity after storage at 70° C. for 4 weeks (cP) | 3.38 | 3.49 | 4.09 | 3.38 | 3.54 |
| | D50 after storage at 70° C. for 4 weeks (nm) | 84 | 98 | 135 | 118 | 137 |
| | D99 after storage at 70° C. for 4 weeks (nm) | 201 | 271 | 361 | 329 | 436 |
| Long-term reliability test (print quality) | | Acceptable | Acceptable | Acceptable | Significantly deteriorated | Could be printed on only up to 30,000 sheets of paper |

The surface-treated carbon black powder dispersions of Examples 1 to 6 were obtained by subjecting carbon black fine particles having a volume average particle size of 100 nm to 20 μm to wet granulation and drying by heating to obtain granulated carbon black having a hardness of 12 cN or less and a pH of less than 7, grinding the granulated carbon black to obtain a ground product, and subjecting the ground product to wet oxidization in an aqueous medium. As shown in Tables 8 and 9, the ink compositions produced using the surface-treated carbon black powder dispersions of Examples 1 to 6 exhibited excellent print density and good storage stability, and could be printed on 50,000 sheets of paper without causing a problem when subjected to the long-term reliability test using the inkjet printer α and the inkjet printer β. Thus, the ink compositions produced using the surface-treated carbon black powder dispersions of Examples 1 to 6 exhibited excellent print quality and good discharge stability.

As shown in Tables 10 and 11, the ink compositions produced using the surface-treated carbon black powder dispersions of Comparative Examples 4 to 6 which were produced by grinding and oxidizing the carbon black fine particles without granulating the carbon black fine particles, exhibited significantly decreased print density as compared with the ink compositions produced using the surface-treated carbon black powder dispersions of Examples 1 to 6. This is considered to be because the carbon black fine particles were excessively ground to a state similar to that of aggregates.

As shown in Tables 10 and 11, the ink compositions produced using the surface-treated carbon black powder dispersions of Comparative Examples 7 to 9 which were produced by oxidizing the carbon black fine particles without-granulating and grinding the carbon black fine particles, exhibited low wettability with ion-exchanged water (i.e., a solvent used for liquid-phase oxidization) since the surface of the carbon black fine particles was not sufficiently oxidized in advance. An ink could not be obtained when using the ink composition for the inkjet printer β that was produced using the surface-treated carbon black powder dispersion of Comparative Example 9 since the surface of the carbon black fine particles was not uniformly oxidized. As shown in Tables 10 and 11, the ink compositions produced using the surface-treated carbon black powder dispersions of Comparative Examples 7 to 9 exhibited a significant deterioration in print quality, or could not be printed on up to 50,000 sheets of paper, due to nonuniform oxidization, high viscosity, and the like.

As is clear from the results shown in Table 8 to 11, the surface-treated carbon black powder dispersion produced by the method according to one embodiment of the invention exhibited excellent print density, print quality, discharge stability, and storage stability when used to produce an inkjet printer aqueous black ink composition. Therefore, the surface-treated carbon black powder produced by the method according to one embodiment of the invention is suitably used as an inkjet printer aqueous black ink pigment.

INDUSTRIAL APPLICABILITY

The invention thus provides a method of producing a surface-treated carbon black powder dispersion that exhibits excellent print density, print quality, discharge stability, and storage stability when used to produce an inkjet printer aqueous black ink composition, and a method of producing a surface-treated carbon black powder that is suitably used as an inkjet printer aqueous black ink pigment.

LIST OF REFERENCE NUMERALS

1: flow straightener
2: combustion chamber
3: narrow section
4: reaction section
5: fuel supply nozzle
6: raw material oil supply nozzle
7: Cooling water nozzle for terminating reaction
11: kneading vessel
12: kneading rod
13: inlet
14: outlet
15: motor

The invention claimed is:

1. A method of producing a surface-treated carbon black powder dispersion comprising subjecting carbon black fine particles having a volume average particle size of 100 nm to 20 μm to wet granulation and drying by heating to obtain granulated carbon black having a hardness of 12 cN or less and a pH of less than 7, grinding the granulated carbon black to obtain a ground product having a volume average particle size of 20 nm to 20 μm, and subjecting the ground product to wet oxidization in an aqueous medium.

2. The method according to claim 1, wherein the carbon black fine particles are produced by a furnace method.

3. A method of producing a surface-treated carbon black powder comprising subjecting carbon black fine particles having a volume average particle size of 100 nm to 20 μm to wet granulation and drying by heating to obtain granulated carbon black having a hardness of 12 cN or less and a pH of less than 7, grinding the granulated carbon black to obtain a ground product having a volume average particle size of 20 nm to 20 μm, subjecting the ground product to wet oxidization in an aqueous medium, and separating the wet-oxidized product.

4. The method according to claim 3, wherein the carbon black fine particles are produced by a furnace method.

* * * * *